(12) United States Patent
Walter

(10) Patent No.: US 9,506,981 B2
(45) Date of Patent: Nov. 29, 2016

(54) INTEGRATED CIRCUIT WITH DISTRIBUTED CLOCK TAMPERING DETECTORS

(71) Applicant: EM Microelectronic-Marin SA, Marin (CH)

(72) Inventor: Fabrice Walter, Hyeres (FR)

(73) Assignee: EM Microelectronic-Marin S.A., Marin (CH)

( * ) Notice: Subject to any disclaimer, the term of this patent is extended or adjusted under 35 U.S.C. 154(b) by 0 days.

(21) Appl. No.: 14/816,453

(22) Filed: Aug. 3, 2015

(65) Prior Publication Data

US 2016/0041226 A1    Feb. 11, 2016

(30) Foreign Application Priority Data

Aug. 7, 2014   (EP) .................................... 14180234

(51) Int. Cl.
*G01R 31/317* (2006.01)
*G06F 21/55* (2013.01)
*G06F 21/75* (2013.01)
*H03K 19/003* (2006.01)

(52) U.S. Cl.
CPC ... *G01R 31/31727* (2013.01); *G01R 31/31719* (2013.01); *G06F 21/554* (2013.01); *G06F 21/75* (2013.01); *H03K 19/003* (2013.01)

(58) Field of Classification Search
CPC ............... G01R 31/31727; G01R 31/31719; G06F 21/554; G06F 21/75; H03K 19/003
USPC ................................................. 326/8; 714/25
See application file for complete search history.

(56) References Cited

U.S. PATENT DOCUMENTS

| | | | | |
|---|---|---|---|---|
| 5,898,711 A * | 4/1999 | Buer | ....................... | G06F 21/87 340/679 |
| 6,535,988 B1 * | 3/2003 | Poisner | ................. | G06F 21/725 713/500 |
| 6,553,496 B1 * | 4/2003 | Buer | ....................... | G06F 21/55 327/18 |
| 7,076,802 B2 * | 7/2006 | Poisner | ................... | G06F 21/71 713/500 |
| 2003/0115503 A1 * | 6/2003 | Lehman | ................... | G06F 1/08 714/25 |
| 2003/0218475 A1 * | 11/2003 | Gammel | ................. | G06F 21/75 326/8 |
| 2016/0041226 A1 * | 2/2016 | Walter | ............ | G01R 31/31719 326/8 |

FOREIGN PATENT DOCUMENTS

| | | | | |
|---|---|---|---|---|
| EP | 2983103 A1 * | 2/2016 | ............ | G06F 21/55 |
| WO | WO 00/45244 | 8/2000 | | |

OTHER PUBLICATIONS

European Search Report issued Oct. 21, 2014 in European Application 14180234.8 filed on Aug. 7, 2014.

* cited by examiner

*Primary Examiner* — Dylan White
(74) *Attorney, Agent, or Firm* — Oblon, McClelland, Maier & Neustadt, L.L.P.

(57) ABSTRACT

A circuit configuration for secure application includes several internal frequency detectors arranged in digital units at critical points of an integrated circuit. The clock detectors are concealed in the digital part of the integrated circuit each as a standard cell (flip-flop unit) in order to prevent any external manipulation and in order to hide its function. The clock detectors are preferably disposed in a clock tree topology, which can be at several levels for distributing the clock signal through the different digital unit tree at critical points. Alarms are generated via a clock detector network if at any level an external clock attack has been monitored.

9 Claims, 7 Drawing Sheets

INTEGRATED CIRCUIT WITH DISTRIBUTED CLOCK TAMPERING DETECTORS

This application claims priority from European patent application No. 14180234.8 filed Aug. 7, 2014, the entire disclosure of which is hereby incorporated herein by reference.

TECHNICAL FIELD

The present invention relates to a circuit configuration for detecting external manipulation of the clock in an integrated circuit. The integrated circuit comprises digital units and at least one clock detector monitoring frequency and duty cycle parameters of a clock signal. In case of a deviation of either frequency or of a duty cycle parameter an alarm signal can be generated at the output of said at least one clock detector.

The present invention further relates to a method for detecting an external manipulation of the clock in a circuit configuration.

BACKGROUND OF THE INVENTION

Integrated circuits developed for secure application usually embed internal frequency detector to prevent from external manipulation of the internal clock using probing techniques. Main threat addressed by such security mechanism is a clock stepping attack to get control for example of CPU operations or of crypto processor engine.

The patent U.S. Pat. No. 7,106,091 B2 discloses the principle of a detector circuit in an integrated circuit. The dedicated detector circuit monitors the interconnect functioning of signal lines between two circuit blocks. The circuit configuration for detecting an unwanted attack on an integrated circuit has a signal line to which a clock signal is applied and at least one line pair which is respectively used to code a bit. The signal line and the at least one line pair are connected between a first and a second circuit blocks in the integrated circuit. The detector circuit changes the operating sequence in the integrated circuit on the basis of the signals on the signal line and on the at least one line pair. The detector circuit can be used to the same extent to test for production faults.

The deficiencies and drawbacks of the known solutions against such threats can be summarized below. So typical properties respectively deficiencies of a clock detector integration include:
- frequency detection cell is usually easy to locate and to modify, as explained in the patent U.S. Pat. No. 7,106,091 B2;
- frequency detection interconnections are usually easy to locate and to modify, as explained in the patent U.S. Pat. No. 7,106,091 B2;
- frequency detection relies on single analog cell that can be easily neutralized as explained in the patent U.S. Pat. No. 7,106,091 B2;
- frequency detection is usually sensing one point to check clock characteristics;
- frequency detection does not check the clock at critical points where signal is used (leaf cells of clock tree);
- frequency detector proposes usually global protection not covering locally critical points, as explained in the patent U.S. Pat. No. 7,106,091 B2;
- frequency detection does not embed self-test function to detect any tampering of the monitoring system.

Further typical properties, respectively deficiencies of a clock detector include:
- frequency detection verifies clock frequency within two limits UFD and OFD but usually not clock characteristic such as duty cycle and
- frequency detection is usually dependent of current sources or other clock signals that could be influenced.

Generally with an internal frequency detector in an analogue part of the integrated circuit, it is easy to detect the interconnection of said detector and to bypass said detector in order to clock externally from the integrated circuit some operations of the CPU.

We can cite the patent application US 2003/0115503 A1, which describes a system for enhancing fault tolerance and security of a computing system. It is provided a detection of a clock signal between several system clocks and secure clocks in case of fault detections or events of the type over or under frequency detection. This is described in particular concerning the fault tolerance of the electronic system in case of fault detection, but not to make immune each clock detector to neutralization attempts from external manipulation.

In the patent application WO 00/45244 A1, it is described security modules in an integrated circuit. Said modules are integrated in parts managing several events, such as voltage, over or under frequency detection, and to have a memorization logic, masking or synthesis function by taking into account events as reset operations. However the proposed security strategy is vulnerable as already described in the prior art. It is not to make immune each clock detector to neutralization attempts from external manipulation.

SUMMARY OF THE INVENTION

The main purpose of invention is to rethink the integration of clock detectors into secure IC design to improve protection coverage and to make IC clock detectors immune to neutralization attempts.

The task of the present invention is to provide a circuit configuration for detecting external manipulation of the clock by clock detectors. The detectors should not be easily detectable by reverse engineering and the clock detectors should be located at critical points of an integrated circuit in order to effectively and immediately monitor an external manipulation of the clock. Critical points are defined as vulnerable nets of clock network that could be controlled by an attacker to lead a security attack. Said critical points are integrated in the integrated circuit structure of at least one portion of a digital unit, which is clocked by a clock signal from an analog block. A security attack is defined as scenario where sensitive information host into integrated circuit is manipulated or disclosed.

This aim is reached by a circuit configuration for detecting external manipulation of the clock in an integrated circuit comprising digital units and at least one clock detector monitoring frequency and duty cycle parameters of a clock signal, where in case of a deviation of either frequency or of a duty cycle parameter an alarm signal is generated at the output of said at least one clock detector,
wherein the circuit configuration has an arrangement of a plurality of said clock detectors at critical points of the integrated circuit, said critical points being integrated in at least one portion of a digital unit of a digital block, which is clocked by a clock signal from an analog block, and
wherein the clock detectors are concealed in digital block, as standard cells which comprise each a set of transistors interconnected together to implement Boolean or storage logic function in said integrated circuit.

This aim is further reached by a method for detecting external manipulation of the clock in a circuit configuration, for which the circuit configuration in an integrated circuit comprising:

digital units in a digital block and at least one clock detector monitoring frequency and duty cycle parameters of a clock signal from an analog block, where in case of a deviation of either frequency or of a duty cycle parameter an alarm signal is generated at the output of said at least one clock detector;

an arrangement of a plurality of said clock detectors at critical points of the integrated circuit, said critical points being integrated in at least one portion of a digital unit of the digital block, which is clocked by a clock signal from the analog block, and the clock detectors being concealed in digital block, as standard cells, which comprise each a set of transistors interconnected together to implement Boolean or storage logic function in said integrated circuit;

the outputs with the alarm signal of the clock detectors being connected with a clock detector network;

wherein a verification of the clock detector network integrity using the alarm signals at the outputs is performed.

A circuit configuration is for detecting external manipulation of the clock in an integrated circuit comprising at least one clock detector monitoring frequency and duty cycle parameters of a clock signal, where in case of a deviation of either frequency or of duty cycle parameters an alarm signal is generated. A plurality of said clock detectors is placed at functionally critical points of the integrated circuit and the clock detectors are concealed as standard cells in said integrated circuit. This circuit configuration provides the following advantages:

i) The invention is based on a furtive respectively concealed multi-point sensing circuitry monitoring globally and locally clock distribution and eventually other sensitive signals.

ii) Efficiency of these security mechanisms can be reinforced with a method for a periodical and/or automatic verification of the clock detector network integrity generating on purpose controlled clock stop events. Those objectives can be achieved by sensing outputs of clock detectors instantiated to verify clock stop event detection and propagation,. This method provides an effective self-test function of integrity of clock tampering detection circuitry.

iii) Detection cell shall be layout to appear as flip-flop cell for example having similar complexity (# number of transistors) compared to the other cells in said integrated digital circuit. Verification of the clock detector network integrity can be achieved periodically by stopping voluntary clock (idle mode entry) and verifying using that all detectors raised an alarm.

BRIEF DESCRIPTION OF THE DRAWINGS

In the following, at least one embodiment of a circuit configuration for detecting external manipulation of the internal clock and a method for detecting an external manipulation of the clock in the circuit configuration will be described by making reference to the drawings, in which.

DETAILED DESCRIPTION OF EMBODIMENTS OF THE INVENTION

Figure 1A:
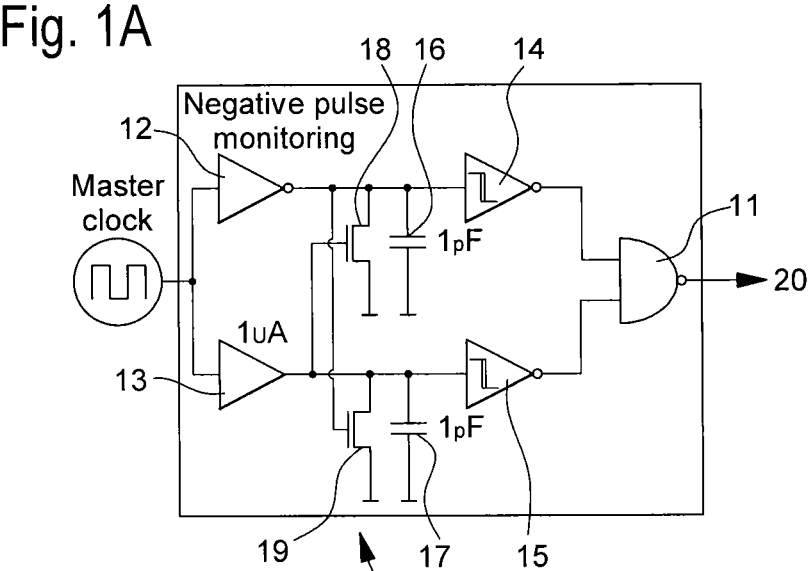
FIG. 1A shows a block diagram of a single clock detector.

Reference is made to FIG. 1A which depicts a block diagram of a clock detector 10 being based on two mono-flops 12, 13 detecting under frequency conditions, for example <1 MHz. Mono-flop 12 monitors clock low state duration and the other mono-flop 13 monitors one clock high state duration. In case clock low state duration is longer than the mono-flop delay of mono-flop 12—together with node full discharge transistor 18—and an alarm event is generated by Schmitt trigger 14 and propagated to output 20 through gate 11, which is for example a NAND gate. In case clock high state duration is longer than mono-flop delay of mono-flop 13—together with node full discharge transistor 19—an alarm event is generated by Schmitt trigger 15 and propagated to output 20 through gate 11.

The mono-flop delay is defined by buffer output drive capability and integrated C capacitor values 16 and 17 respectively for clock low duration state and clock high duration state. By this manner the clock detector 10 can monitor frequency and duty cycle parameters of the clock signal. In case of a deviation of either frequency or of duty cycle parameters an alarm <<clock tamper detected>> 20 is generated.

It can be easily derived that the proposed clock detector 10 has a complexity similar to other standard cells of a digital unit, since the clock detector 10 is concealed a standard cell, that is as flip-flop unit. This allows on preventing any external manipulation as well as an effective hiding of these clock detectors 10 within an integrated circuit. In this context the term standard cell comprises a set of transistors interconnected together to implement Boolean or storage logic function between input(s) and output(s). The layout of this cell is formatted in a way that cells could assemble into an array to build more complex function in a compact manner. Clock detector 10 can be effectively layout as set of transistors with interconnections.

The clock detector 10 as disclosed above is not dependent of other clock signals (which might be also be tampered), since the characteristics of the clock are mapped in the specific parameters for the components as mono-flop 12, 13, the Schmitt trigger 14, 15 and the others. This is a considerable advantage.

Figure 1B:
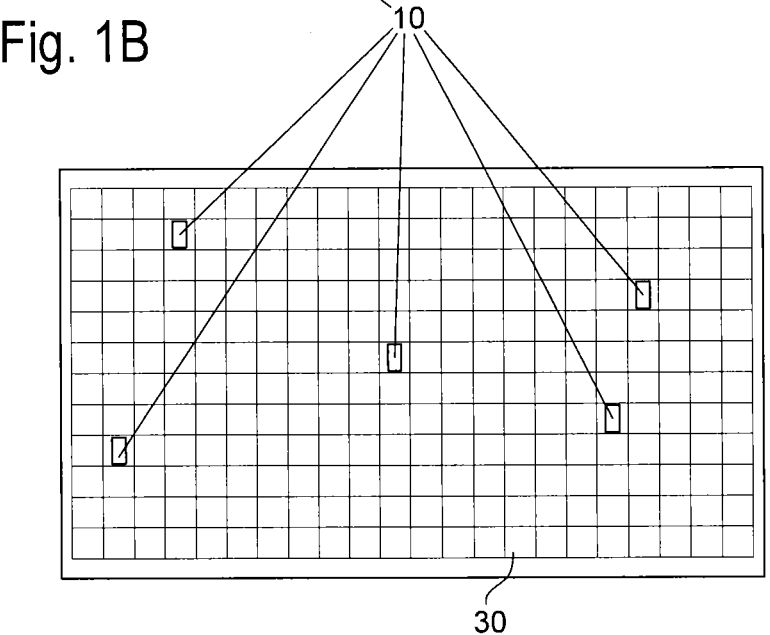
FIG. 1B schematically shows an arrangement of a plurality of clock detectors in an integrated circuit.

FIG. 1B depicts the principle of an arrangement of a plurality of clock detectors 10 in an integrated circuit 30. The clock detectors 10 are placed in the integrated circuit at specific locations respectively at critical points for protecting for example a specific cell or register, a specific function or a group of specific functions.

The outputs 20 with the alarm <<clock tamper detected>> 20 of the clock detectors 10 are connected with a clock detector network (not explicitly shown in the drawings) generating an alarm, when only one clock detector 10 monitors a deviation of the clock.

Figure 2:
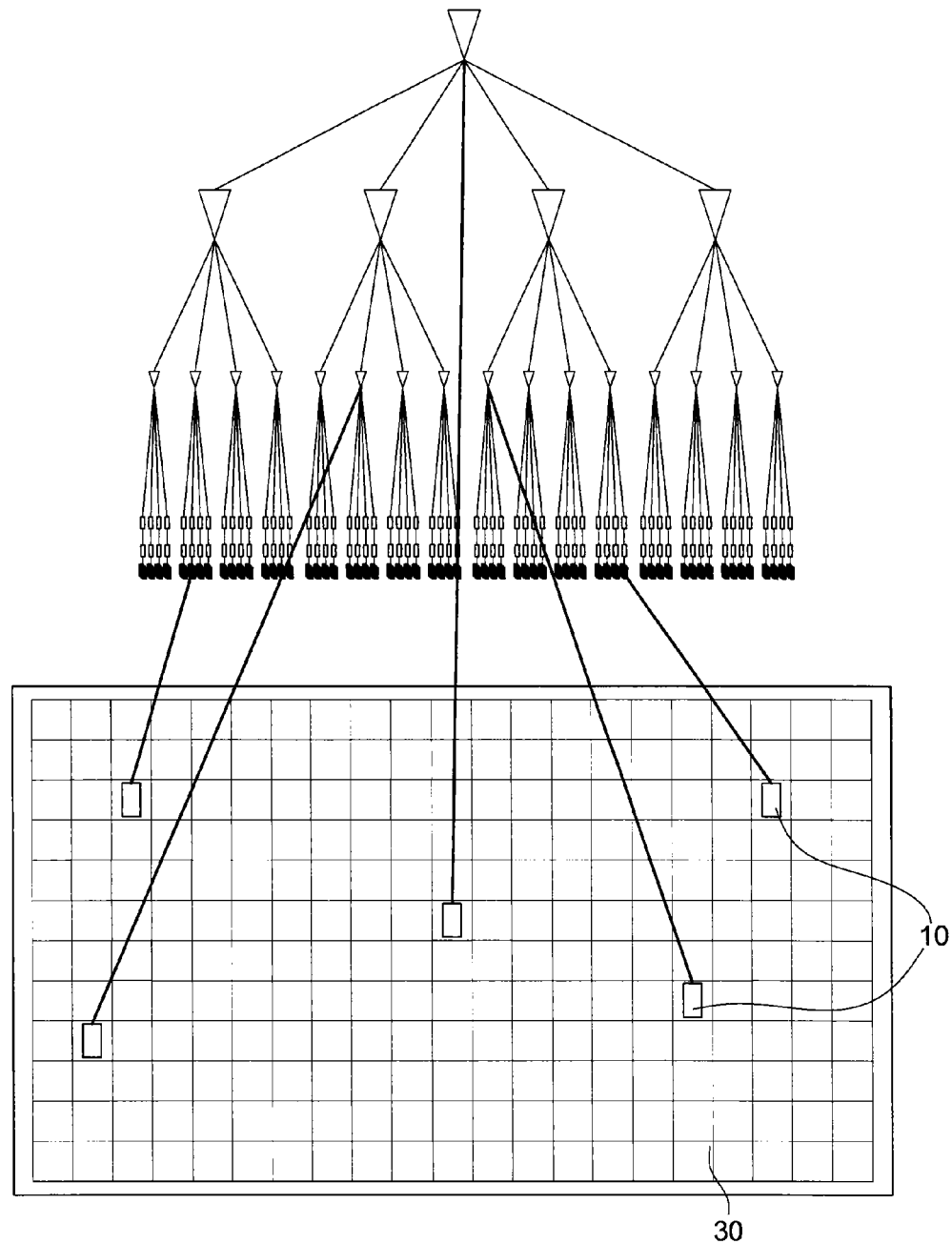
FIG. 2 shows a more sophisticated arrangement of a plurality of clock detectors in an integrated circuit following a clock tree buffering topology.

FIG. 2 depicts a more sophisticated circuit configuration. A protection of an integrated circuit 30 is reached with a plurality of clock detectors 10 in a so called clock tree topology. The clock detectors 10 are functionally placed at different levels. This allows a specific detection of an external manipulation of the clock.

The levels can be defined as:
whole integrated circuit 30, for example level 0;
specific function as e.g. crypto processor, for example level 1;
particular register, for example level 2.

It has to be emphasized, that the local placement of the detectors 10 within the integrated circuit is completely independent from the placement at different functional levels. The outputs 20 with the alarm <<clock tamper detected>> 20 of the clock detectors 10 are connected with a clock detector network according to their assigned level. This allows a generation of a level specific alarm <<clock tamper detected>>.

Figure 3:
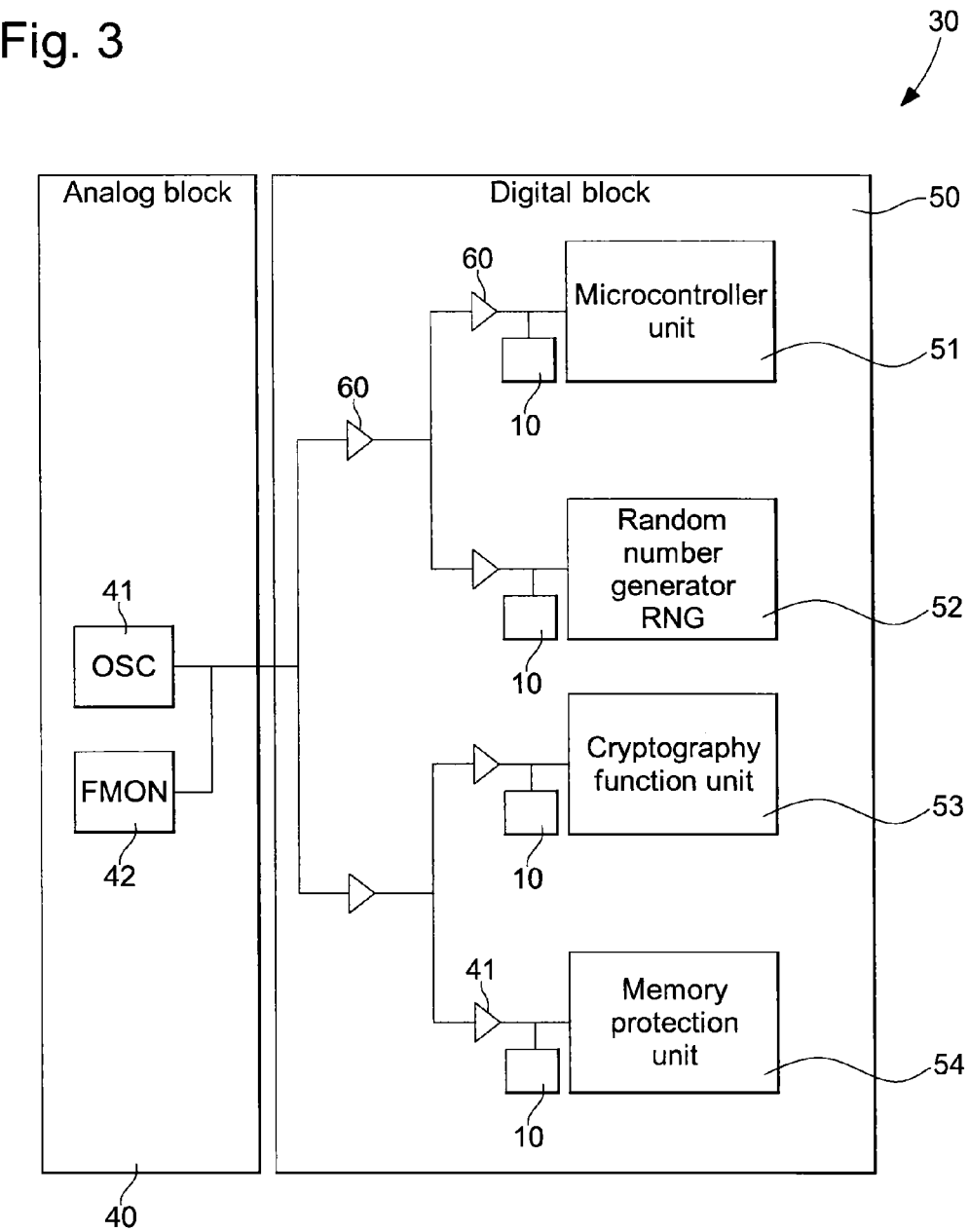
FIG. 3 shows in more details an example of the arrangement of clock detectors in digital block of an integrated circuit.

As we can see in more details in FIG. 3, the integrated circuit 30 includes in a general manner an analog block 40 connected to a digital block 50 comprising several digital units 51, 52, 53, 54 each with at least one clock detector 10. The digital block 50 can comprise a microcontroller unit 51, a random number generator RNG 52, a cryptography function unit 53 and a memory protection unit 54.

In the analog block 40, there are an oscillator 41 for supplying signal clock CLK for several digital units of the digital block 50, and a cell 42 for frequency monitoring FMON of the oscillator signal characteristics. Usually said level of protection of the integrated circuit can be defeated by neutralizing FMON in particular from external manipulation. Said frequency monitoring cell verifies that the signal frequency delivered by OSC oscillator 41 is within frequency monitoring limits defined by security architect. This is the typical organization, we will find commonly implemented in secure IC having such frequency monitoring security function.

The clock signal generated by the oscillator 41 is supplied to several digital units from the digital block 50 for example through amplifier buffers 60 not inverters in order to clock different operations in the digital block 50. With this arrangement as a tree topology having different functional levels, it is possible to verify bufferized clock signal closer to the use point. So the effort to locate and to recognize the different clock detectors 10 and to neutralize them with an external manipulation becomes extremely difficult. This configuration allows for guaranteeing a good security of the integrated circuit and for improving the protection coverage by making immune clock detectors to neutralization attempts.

Figure 4:
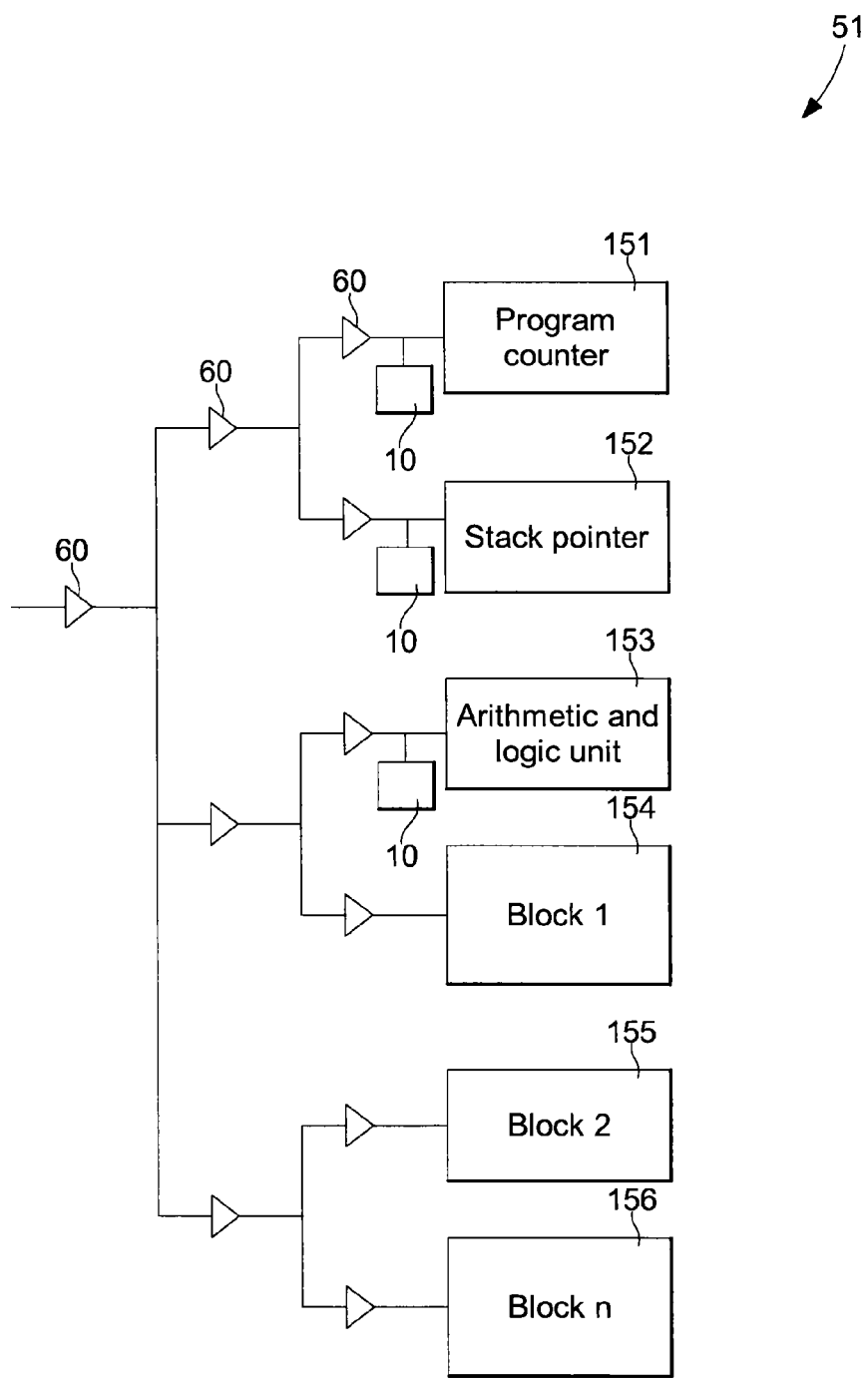
FIG. 4 shows an example of the arrangement of clock detectors in portions of a microcontroller unit of the integrated circuit.

FIG. 4 shows the different components of the microcontroller unit 51 in the digital block of the integrated circuit. The microcontroller unit 51 includes a program counter 151, a stack pointer 152, an arithmetic and logic unit 153 and a set of n blocks, which are shown by the first block 154, the second block 155 and the $n^{th}$ block 156. There are clock detectors 10 placed at input of program counter 151, stack pointer 152 and arithmetic and logic unit 153, which are clock monitoring points more vulnerable by security architecture. No clock detectors 10 are provided for the set of n blocks given that they are non-vulnerable blocks.

Figure 5:
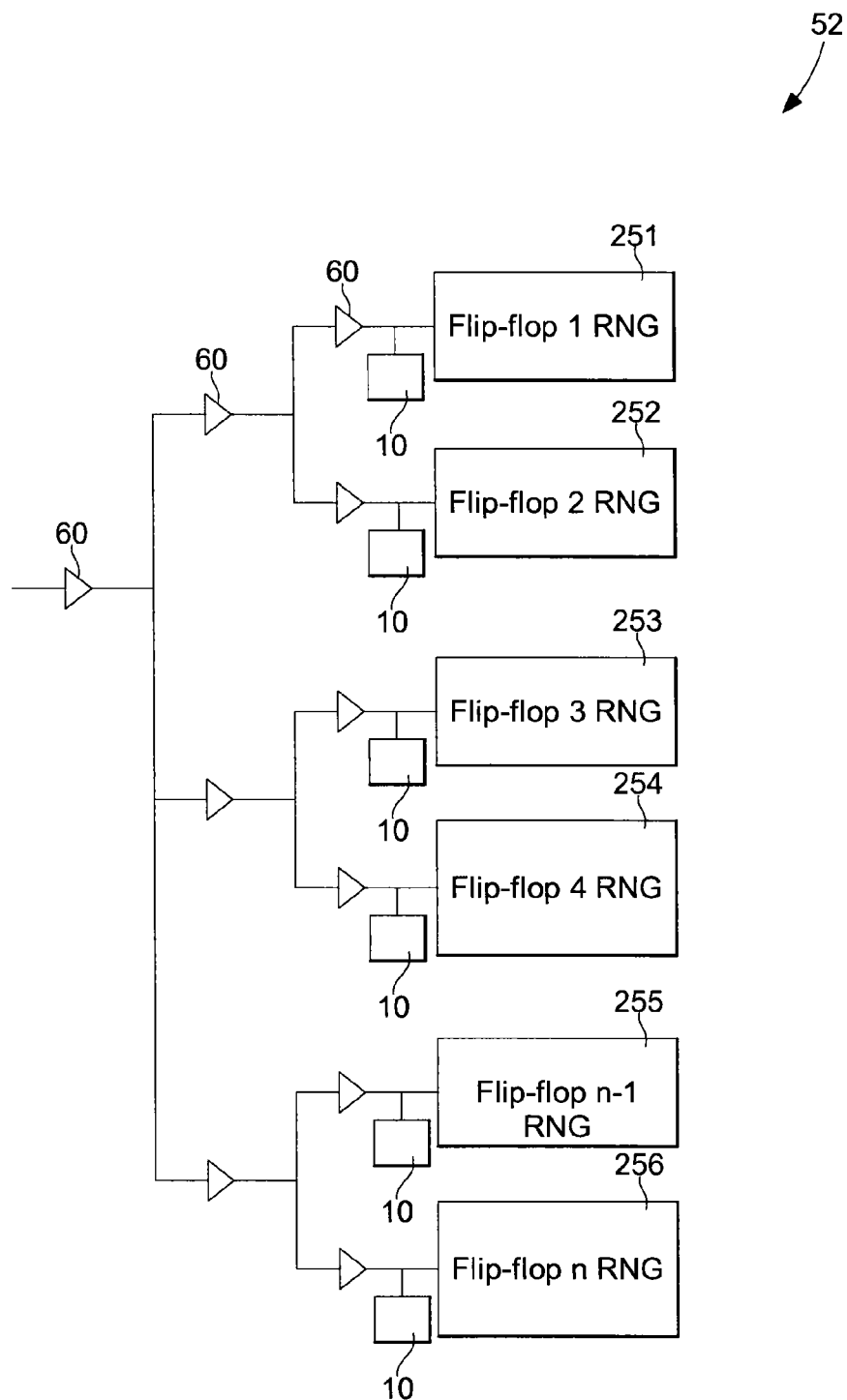
FIG. 5 shows an example of the arrangement of clock detectors in portions of a random number generator of the integrated circuit.

FIG. 5 shows the different components of the random number generator RNG 52 in the digital block of the integrated circuit. Said random number generator RNG 52 are shown with a set of n flip-flops. There are shown first flip-flop 251, second flip-flop 252, third flip-flop 253, fourth flip-flop 254, $(n-1)^{th}$ flip-flop 255 and $n^{th}$ flip-flop 256. A specific clock detector 10 is placed at each input of the different flip-flops. By considering the low complexity of the flip-flops to be protected, security architecture can envisage to protect all the flip-flops by the clock detectors 10 against any clock manipulation.

Figure 6:
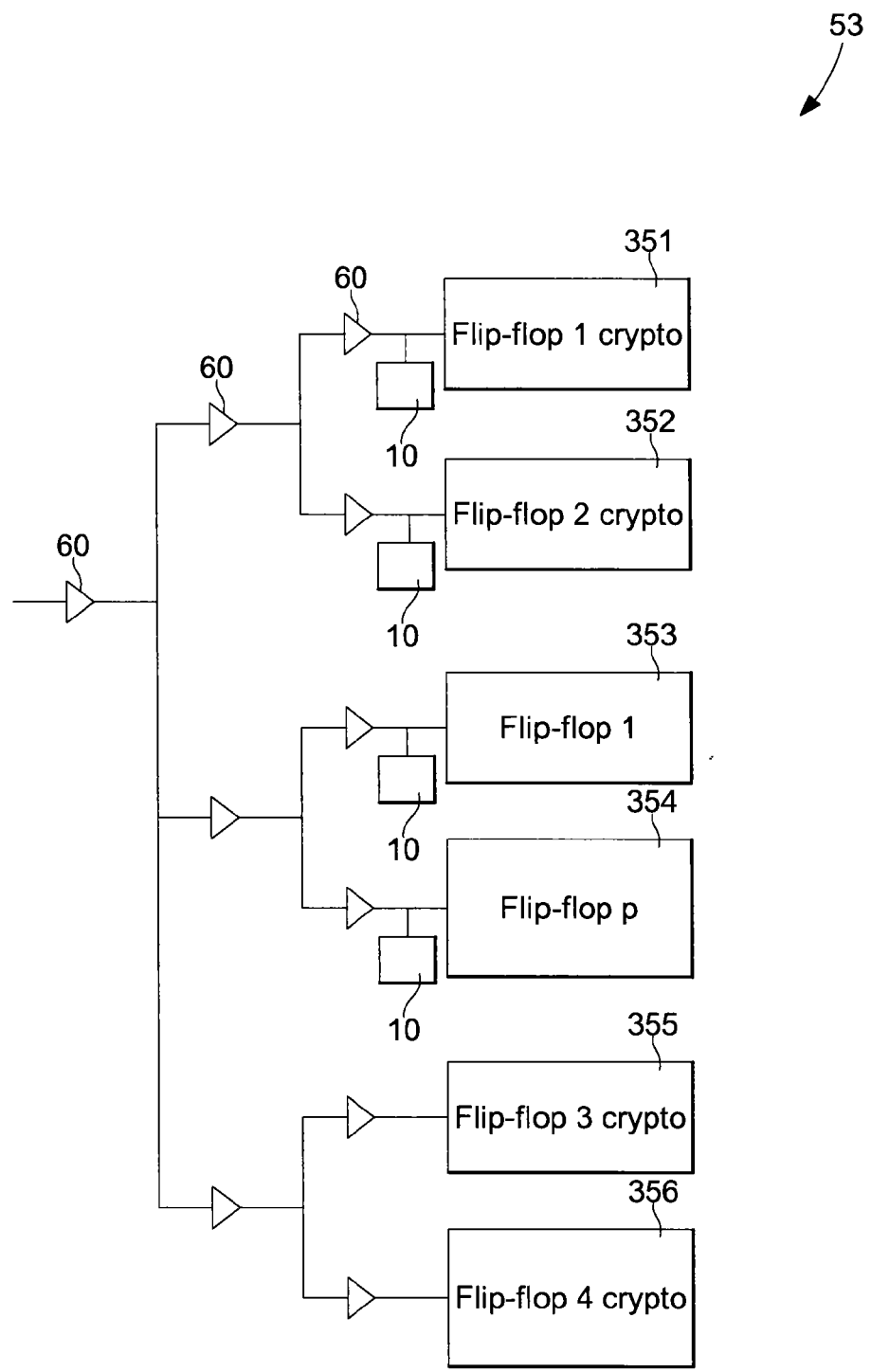
FIG. 6 shows an example of the arrangement of clock detectors in portions of a cryptography function unit of the integrated circuit.

FIG. 6 shows the different components of the cryptography function unit 53 in the digital block of the integrated circuit. Said cryptography function unit 53 can include a first flip-flop crypto 351, a second flip-flop crypto 352, a first key storage flip-flop 353, a second key storage flip-flop 354 or other, a third flip-flop crypto 355 and a fourth flip-flop crypto 356. For the security architect aware about fault attacks, it can be provided to place a clock detector at input of first flip-flop crypto 351, second flip-flop crypto 352, first key storage flip-flop 353, and second key storage flip-flop 354.

Figure 7:
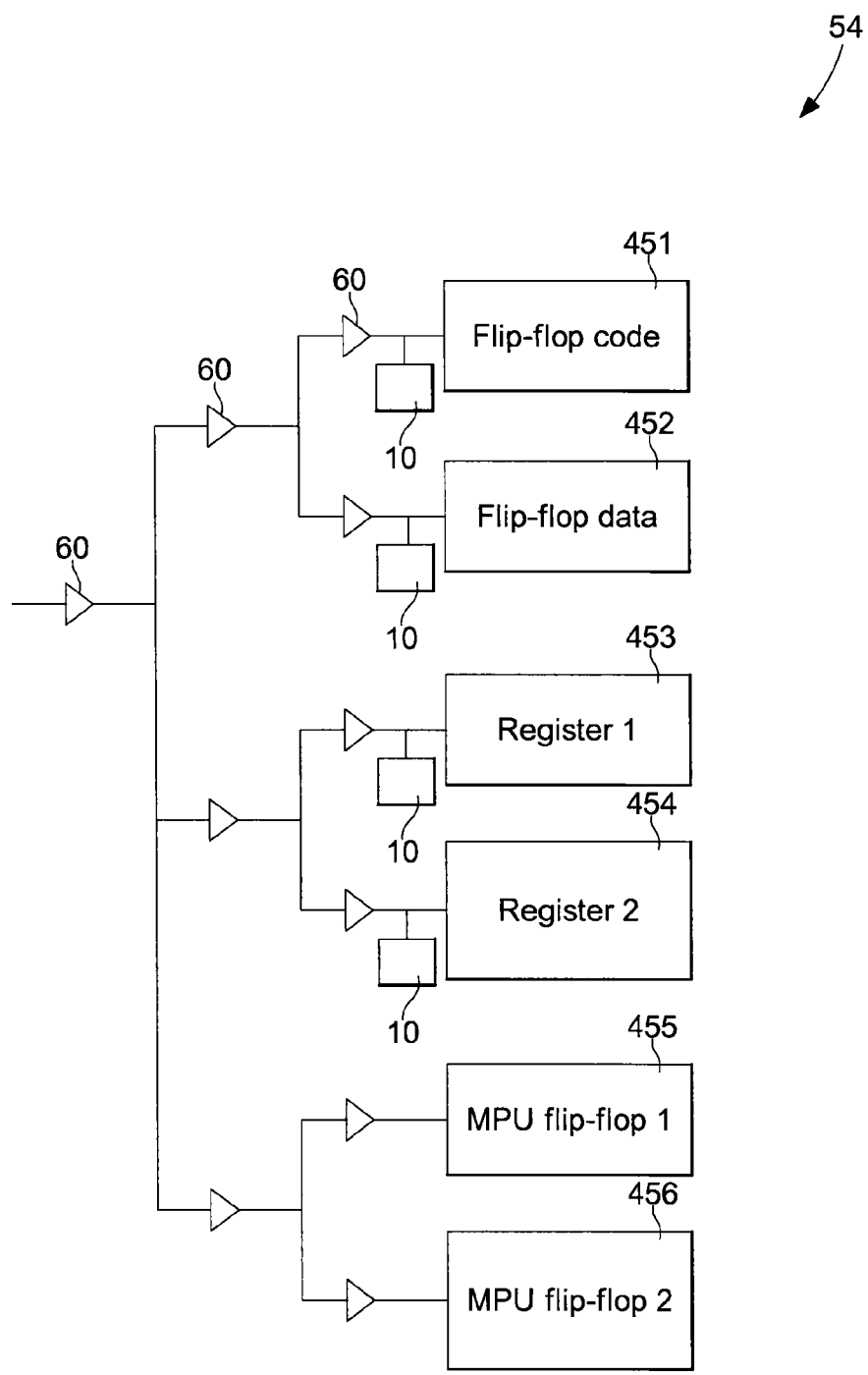
FIG. 7 shows an example of the arrangement of clock detectors in portions of a memory protection unit of the integrated circuit.

FIG. 7 shows the different components of the memory protection unit 54 in the digital block of the integrated circuit. Said memory protection unit 54 can include a flip-flop code 451, a flip-flop data 452, a first register 453, a second register 454, a first MPU flip-flop 455 and a second MPU flip-flop 456. By considering the memory protection unit security function in order to protect said circuit against illegal memory access, it is important to place a clock detector 10 at each input of flip-flop code 451, flip-flop data 452, first register 453 and a second register 454.

The invention is not limited to clock detectors 10 as disclosed above. Clock detectors 10 with other components as disclosed above could be also envisaged. However it is important, that the complexity of the clock detector 10 remains comparable to the other cells in particular of a digital unit in digital clock of the integrated circuit.

What is claimed is:

1. A circuit configuration for detecting external manipulation of a clock in an integrated circuit comprising digital units and at least one clock detector monitoring frequency and duty cycle parameters of a clock signal, where in case of a deviation of either frequency or of a duty cycle parameter an alarm signal is generated at an output of said at least one clock detector, said configuration comprising:
an arrangement of a plurality of clock detectors at critical points of the integrated circuit, said critical points being integrated in at least one portion of a digital unit of a digital block, which is clocked by a clock signal from an analog block,
wherein the plurality of clock detectors are concealed in a digital block as standard cells, which each comprise a set of transistors interconnected together to implement a Boolean or a storage logic function in said integrated circuit.

2. The circuit configuration according to claim 1, wherein the at least one clock detector is arranged within the digital unit.

3. The circuit configuration according to claim 1, wherein the at least one clock detector has a complexity similar to the standard cells of the digital unit.

4. The circuit configuration according to claim 3, wherein the at least one clock detector is concealed as a flip-flop unit.

5. The circuit configuration according to claim 1, wherein the output of the at least one clock detector is connected with a clock detector network in which the alarm signal is generated, when only one clock detector monitors the deviation of the clock.

6. The circuit configuration according to claim 1, wherein the arrangement of the plurality of clock detectors is in a tree topology having different functional levels, and wherein the different functional levels are independent from a local placement of the plurality of clock detectors within the integrated circuit.

7. The circuit configuration according to claim 6, wherein the output of the at least one clock detector is connected in a clock detector network according to an assigned level in which a level-specific alarm is generated, when only one clock detector of a specific assigned level monitors the deviation of the clock.

8. A method for detecting external manipulation of a clock in a circuit configuration in an integrated circuit comprising digital units and at least one clock detector, the configuration comprising an arrangement of a plurality of clock detectors at critical points of the integrated circuit, said critical points being integrated in at least one portion of a digital unit of a digital block, which is clocked by a clock signal from an analog block, wherein the plurality of clock detectors are concealed in a digital block as standard cells, which each comprise a set of transistors interconnected together to implement a Boolean or a storage logic function in said integrated circuit, the method comprising:

monitoring, by said at least one clock detector, frequency and duty cycle parameters of the clock signal from the analog block;

generating an alarm signal at an output of said at least one clock detector when there is a deviation of either the frequency parameter or the duty cycle parameter, wherein the output is connected with a clock detector network; and performing a verification of integrity of the clock detector network using the alarm signal at the output.

9. The method according to claim 8, wherein the verification is performed periodically and/or automatically in order to provide a self-test of the circuit configuration.

* * * * *